United States Patent [19]

Uchiyama

[11] Patent Number: 4,729,108
[45] Date of Patent: Mar. 1, 1988

[54] APPARATUS FOR DETERMINING A COORDINATE OF A GIVEN POINT ON A TABLET

[75] Inventor: Bunji Uchiyama, Sagamihara, Japan
[73] Assignee: Hitachi Seiko Ltd., Japan
[21] Appl. No.: 774,471
[22] Filed: Sep. 10, 1985
[51] Int. Cl.$^4$ .................. G08C 21/00; G06F 15/20
[52] U.S. Cl. ......................... 364/520; 178/18
[58] Field of Search .................. 364/520, 560; 178/18–20; 340/706–708

[56] References Cited

U.S. PATENT DOCUMENTS

| | | | |
|---|---|---|---|
| 4,205,199 | 5/1980 | Mochizuki | 178/19 |
| 4,255,617 | 3/1981 | Carau, Sr. et al. | 178/19 |
| 4,477,877 | 10/1984 | Nakamura et al. | 178/18 |
| 4,507,523 | 3/1985 | Gohara et al. | 178/19 |
| 4,575,580 | 3/1986 | Jandrell | 178/18 |

Primary Examiner—Felix D. Gruber
Attorney, Agent, or Firm—Antonelli, Terry & Wands

[57] ABSTRACT

A coordinate detection system is disclosed which comprises a pointer which is excited by current of a predetermined frequency. Two conductors are arranged on a tablet for producing voltages which depend on the position of the tablet at which the pointer is located. Selector wires are arranged at intervals of half cycles of the conductors and a processor computes the position pointed to on the tablet based on an output voltage obtained, while scanning selected selector-wire pairs, sequentially, from any selected selector-wire pair exceeding a predetermined set voltage. The processor provides an output indicating the phase difference between waveforms induced in said two conductors.

6 Claims, 10 Drawing Figures

APPARATUS FOR DETERMINING A COORDINATE OF A GIVEN POINT ON A TABLET

BACKGROUND OF THE INVENTION

The present invention relates to a coordinate detection system for detecting a position on a tablet pointed by a pen or a cursor.

A coordinate detection system comprises a pointing pen or a cursor, means for supplying a sinusoidal wave voltage to the pen or cursor, a tablet including X-axis and Y-axis bases with detection conductors arranged thereon and a coordinate region detection base with selector conductors arranged thereon, and means for processing the signals produced in the detection conductors and the selector conductors to determine the X and Y coordinates of the point on the tablet pointed to by the pen or cursor.

Figure 1:
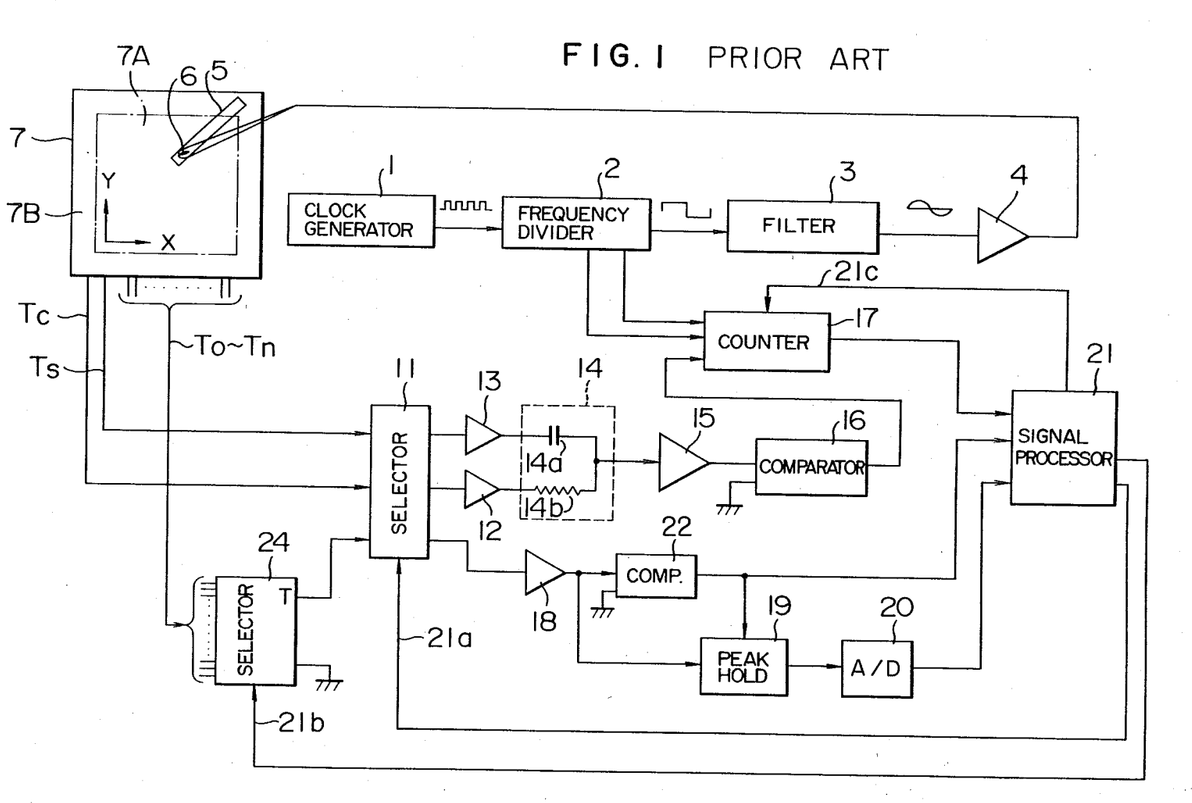
FIG. 1 is a block diagram showing a circuit configuration of a conventional coordinate detection system.

A block diagram of such a conventional coordinate detection system is shown in FIG. 1, a layout of the detection conductors and selector conductors on the tablet of FIG. 1 is shown in in FIG. 2(a), and a graph of the detection values detected by the conductors is shown in FIGS. 2(b) and 2(c). In these drawings, reference numeral 1 designates a clock generator for generating clock pulses of a predetermined frequency, numeral 2 a frequency-divider for dividing the frequency of the clock pulses, numeral 3 a filter for converting the rectangular wave of the frequency divider 2 into a sinusoidal wave, numeral 4 an amplifier for amplifying this sinusoidal wave, and numeral 5 a pointer such as a stylus pen having a coil 6 impressed with the amplified sinusoidal wave. Numeral 7 designates a tablet including an effective region 7A and a marginal region 7B surrounding the region 7A for supporting the X- and Y-axis bases and the coordinate region detection base. FIG. 2(b) shows two detection conductors (hereinafter referred to as "the sin wire" respectively) arranged on the X-axis base and a selector conductor arranged on the coordinate region detection base. In the diagram of FIG. 2(a), the dimension along the Y axis is compressed and only a part is shown along the X axis, but it should be understood that the cos wire, sin wire and selector conductor co-extend over substantially the entire region of the tablet 7 of FIG. 1. The layout of the cos wire and sin wire and the relationship with the selector conductor on the Y-axis base are identical to those on the X-axis base, except that the arrangement is turned by 90 degree. Therefore, the following explanations will be made to only the X axis.

As shown in FIG. 2(a), the selector conductor 10 includes a basic line S parallel to the X axis and a plurality of equally-spaced selector element wires $S_0$, $S_1$, $S_2$, . . . , $S_n$ ($S_n$ not shown) extending parallel to the Y axis from the basic line S, and is arranged in such a manner that the element wire $S_2$ coincides with the left side of the effective region 7A of the tablet. Specifically, assuming that the interval between adjacent two element wires is one pitch, the left two pitches of the selector element conductor are located in the left portion of the marginal region 7B of the tablet. Though not shown, the element wire $S_{n-2}$ coincides with the right side of the effective region 7A, and the right two pitches of the selector conductor are located in the right marginal region of the tablet. The length of each element wire is determined in such a manner that the upper and lower ends thereof at least reach the upper and lower sides respectively of the effective region. The cos wire 8 (shown by the solid line) is arranged in a rectangular wave configuration with each cycle equal to one pitch of the selector conductor. Each rising point of the rectangular wave configuration preferably coincides with each selector element wire, but for purposes of manufacture, they are isolated slightly in parallel. Each falling point of the rectangular wave configuration, on the other hand, coincides substantially with the center of each pitch. The sin wire 9 shown by the dotted line is arranged, similarly to the cos wire, in a rectangular wave configuration, but displaced by ¼ cycle in phase (90 degrees in electrical angle) from the cos wire. The height and lateral length of the cos wire and sin wire are selected to fully cover at least the effective region 7A. Respective ends of the cos and sin wires are connected with output terminals Tc, Ts, the other terminal thereof being grounded. The selector element wires $S_0$, $S_1$, $S_2$, $S_3$, $S_4$, and so on are provided with output terminals $T_0$, $T_1$, $T_2$, $T_3$, $T_4$, and so on, respectively.

Turning to FIG. 1, numeral 11 designates a selector for receiving output signals from the terminals Tc and Ts of the tablet 7 and the output terminal T of another selector 24. The selector 11 is switchable between first and second modes selectively by control of a signal 21a from a signal processor 21. In the first mode, the output signals from Tc and Ts are applied to amplifiers 12 and 13 respectively, and in the second mode, an output signal from the terminal T of the selector 24 is applied to an amplifier 18. Numeral 14 designates an adder including an integrating capacitor 14a and a resistor 14b for adding the integrated value of the output of the amplifier 13 to the output of the amplifier 12. Assume that a sinusoidal wave represented by "A sin ωt" is applied to the coil 6 of the stylus pen 5 from the amplifier 4. The output of the adder 14 takes the form of a sinusoidal wave whose phase is deviated from the sinusoidal wave applied to the coil 6 by a value dependent on the position of the stylus pen. More particularly, assume that each cycle of the cos wire, that is, the interval from one rising point to the next rising point is 1 pitch covering the distance of P, and that the stylus pen is located at a point distant by d from the one rise point making up the start point of the same cycle. The output of the adder 14 is a sinusoidal wave whose phase is different by $2\pi/(d/P)$ in electrical angles from the sinusoidal wave applied to the coil 6. The output of the adder 14 is applied, after being amplified by the amplifier 15, to the comparator 16. The comparator produces a high-level signal when the input signal thereto is larger than zero. The sinusoidal output wave of the adder 14 is thus converted into a rectangular wave which rises at each positive half cycle of the output wave of the adder 14. The counter 17 is cleared by a signal 21C from the signal processor, is set at the rising point of a rectangular wave from the frequency divider 2 to start counting the clock pulses supplied from the clock generator 1, and stops counting at the rising point of the output rectangular wave of the comparator 16. The value at the counter 17 represents the phase difference $2\pi(d/p)$ between the sinusoidal wave applied to the coil 6 of the stylus pen and the output sinusoidal wave of the adder 14, which value is applied to the signal processor 21 immediately after the counter stops counting. This phase difference $2\pi(d/p)$ is proportional to the distance d from a rising point providing an origin of the cycle of the cos wire where the stylus pen is located, and therefore the distance can be indicated by the count of the counter. This distance will hereinafter be referred to as "the PD value". FIG. 2(b) shows PD values Na and Nb for the positions A and B of the stylus pen respectively.

The selector 24 has input terminals connected with the terminals $T_0, T_1, T_2, \ldots, T_n$ of the selector conductor. By means of the signal 21b from the signal processor 21, terminal pairs $(T_0, T_2), (T_1, T_3), (T_2, T_4), \ldots$ are sequentially selected, so that one terminal of each pair is grounded, and the other terminal thereof connected to the output terminal T. Specifically, the terminals $T_0, T_1, T_2, \ldots, T_{n-2}$ are sequentially grounded, while the terminals $T_2, T_3, \ldots, T_n$ are sequentially connected to the output terminal T simultaneously with grounding of the terminals $T_0, T_1, T_2, \ldots, T_{n-2}$, respectively. Generally speaking, when the terminal $T_m$ (m=0 to n−2) is grounded, the terminal $T_{m+2}$ is connected to the output terminal T. The output terminal T is applied to the selector 11, and then, in the second mode of the selector 11, to the amplifier 18. Curves $V_0, V_1, V_2, \ldots$ in FIG. 2(c) represent the relationship between the position of the stylus pen and the peak value of the voltage, or generally the amplified sinusoidal wave voltage induced across each terminal pair of $(T_0, T_2), (T_1, T_3), (T_2, T_4), \ldots$ by the sinusoidal wave voltage applied to the coil 5. In the case where the stylus pen is located at position A, for instance, a voltage with a peak value equal to the height Va2, measured from the O axis, of the intersection of the curve $V_2$ and the vertical line passing through the point A is produced. Simultaneously, the voltages with peak values Va1 and Va3 are induced across the terminal pairs $(T_2, T_4)$ and $(T_3, T_5)$ respectively, while no voltage is produced across any other terminal pairs. Though not shown, it will be easily understood that when the stylus pen is located to the right of the selector element wire $S_2$ in proximity thereto, voltages are generated across the terminal pairs $(T_0, T_2), (T_1, T_3)$ and $(T_2, T_4)$ respectively. The voltage induced across a terminal pair selected by the selector 24 is amplified at the amplifier 18 in the second mode of the selector 11, and compared with a "0" level at the comparator 22. Specifically, when a voltage is generated across the selected terminal pair, a "1" signal is produced from the comparator 22, so that the peak hold circuit 19 holds the peak value of the output voltage of the amplifier 18 or the amplitude value of the sinusoidal wave in response to the "1" signal. The output from the hold circuit 19 is converted into a digital value by an A/D converter 20 and applied to the signal processor 21. The "1" output signal of the comparator 22 is also applied to the signal processor 21, which, in response to the "1" output signal, stores the digital value applied from the A/D converter 20 in an internal memory (not shown) while at the same time storing in the same memory the serial number of the terminal pair associated with the "1" output signal, such as the number "1" of the terminal $T_1$ if the pair is $(T_1, T_3)$, for example. The signal 21b from the signal processor 21 is used to switch the selector 24 so that all the terminal pairs are sequentially selected, whereby the serial number of any terminal pair where a voltage is detected and the peak value of the detected voltage are stored in the signal processor 21. When the stylus pen is located at point A in FIG. 2(a), for instance, the peak voltage values Va2, Va1 and Va3 are detected in the terminal pairs $(T_1, T_3), (T_2, T_4)$ and $(T_3, T_5)$ respectively, so that the serial numbers "1", "2" and "3" of the respective terminal pairs and corresponding peak values Va1, Va2 and Va3 are stored respectively in the signal processor.

The control signals 21a, 21b and 21c from the signal processor 21 are generated at the timings mentioned below. With the initial energization of this system for starting its operation, the selectors 11, 24 and the counter 17 are initialized. That is, the selector 11 is set in the second mode, the selector 24 in the state in which none of the terminal pairs is selected, and the counter 17 is cleared. At the next instant, pulse signals 21b ae generated sequentially at a predetermined time interval, and the selector 24 selects the terminal pairs $(T_0, T_2), (T_1, T_3), (T_2, T_4)$ and so on sequentially in response to the pulse signal 21b, and connects the first terminal of each selected pair to the ground potential and the second terminal thereof to the output terminal T. The above-mentioned time interval is determined to be longer than the time required for detecting the voltage induced across the selected terminal pair and storing the necessary data thereof in the signal processor as mentioned above. In this way, all the terminal pairs are scanned by the signal 21b generated sequentially, and are scanning cycle is thus completed after processing on the last terminal pair $(T_{n-2}, T_n)$. If a voltage is detected from any of the terminal pairs during this one scanning cycle, the generation of the pulse signal 21b is suspended and the signal 21a is switched from "low" to "high" level thereby setting the selector 11 in the first mode. Then, the phase difference between the sinusoidal wave of the cos and sin wires is detected in the manner described above and stored in the signal processor 21. At the same time, a clear signal 21C is generated to clear the counter 17. On the other hand, the signal processor 21 calculates the X-coordinate of the position of the stylus pen on the basis of the data regarding the terminal pairs of which the voltages are detected, the peak values of the detected voltages and the phase difference between the sinusoidal waves of the cos and sin wires. Upon completion of this processing operation, the signal 21a is changed from a "high" to a "low" level to restart generation of the pulse signal 21b. When no voltage is detected from any terminal pair during one scanning cycle of the terminal pairs by the selector 24, the generation of the pulse signal 21b is not suspended upon completion of the one scanning cycle, but is continued to repeat the next cycle for scanning the terminal pairs.

Figure 2:
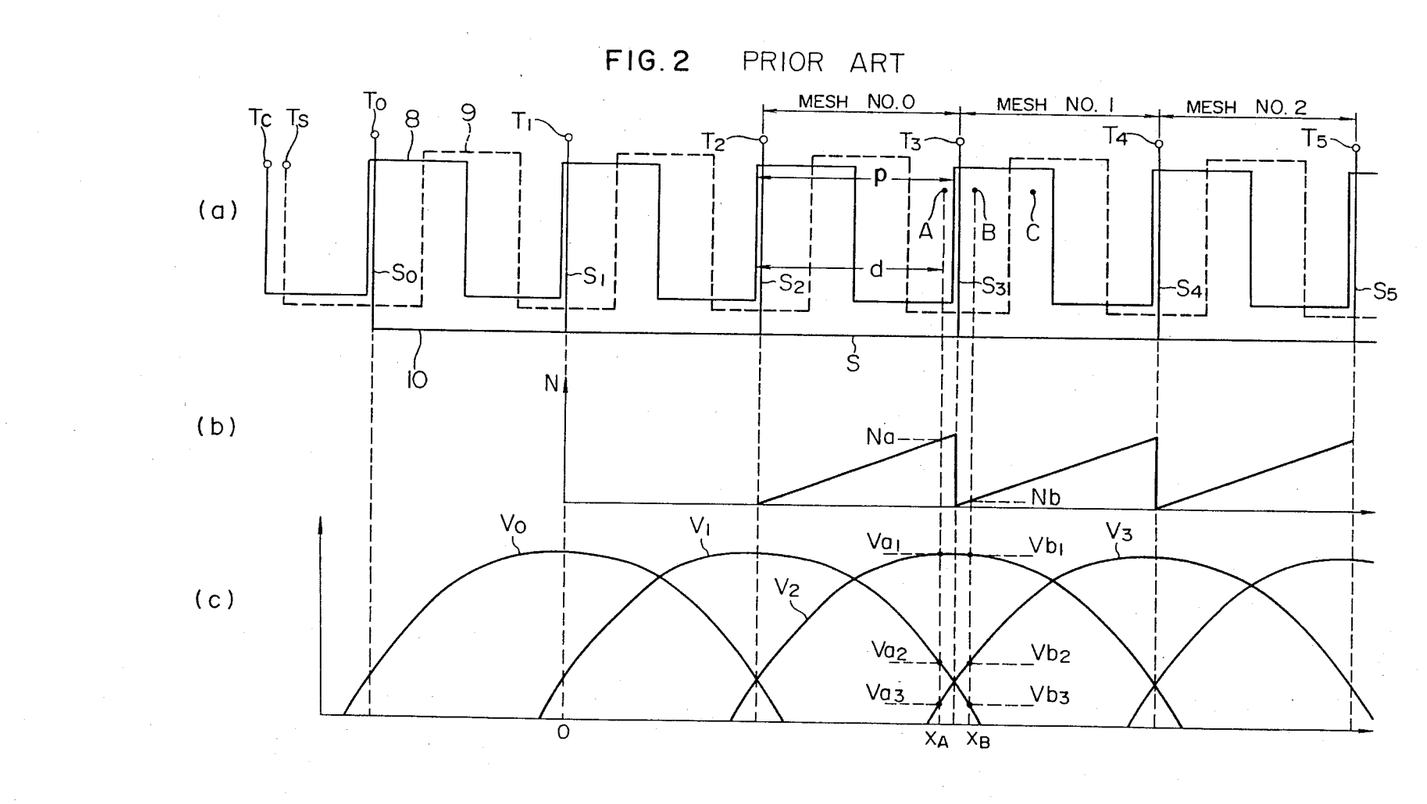

Now, the processing operation for determining the X-coordinate of the stylus pen position by the signal processor 21 will be explained. Assuming that the intervals of the selector element wires $(S_2, S_3), (S_3, S_4), (S_4, S_5)$ and so on are designated as mesh No. 0, mesh No. 1, mesh No. 2, and so on with the interval corresponding to one cycle of the cos or sin wire as one pitch as shown in FIG. 2, the processing operation is carried out to first determine the mesh in which the stylus pen is located from the data regarding the counts of serial numbers of the terminal pairs where voltages are detected and the peak values of the detection voltages. The mesh number thus determined and the phase difference between the sinusoidal waves of the cos and sin wires are used to calculate the X-coordinate of the stylus pen. In this case, the counts of the terminal pairs where voltages are detected are 2 or 3 depending on the position of the stylus pen. If the stylus pen 5 is placed substantially perpendicular to the tablet 7, the curves $V_0, V_1$, and so on representing the relationship between the peak value of the detection voltage and the stylus pen position are symmetric with respect to the selector element wires $S_1$, $S_2$ and so on, respectively, as shown in FIG. 2(c). However, when the stylus pen 5 is tilted against the tablet 7, the curves $V_0$, $V_1$ and so on are asymmetric with respect to the selector element wires $S_1$, $S_2$ and so on, so that, the peak value of the detected voltage is indefinite even with a fixed position of the stylus pen. Further, due to the fact that the counts of the terminal pairs from which voltages are detected are 2 or 3, the processing operation for determining the mesh where the stylus pen is located is very complicated.

The Y-coordinate of the stylus pen position can be determined in a similar manner by use of a system similar to the one mentioned above placed perpendicular to that of the X-coordinate.

SUMMARY OF THE INVENTION

The object of the present invention is to obviate the above-mentioned disadvantages and to provide a coordinate detection system capable of detecting a coordinate region with greater ease.

In order to achieve this object, according to the present invention, there is provided a coordinate detection system in which selector element wires of the selector conductor are arranged with equal intervals each corresponding to a half cycle of a cos or sin wire, terminal pairs of the selector conductor are scanned sequentially to detect an output voltage induced across any terminal pair, any detected output voltage is compared with a set value. After one scanning cycle of the terminal pairs, the number of any terminal pairs from which the voltages are detected to be higher than the set value is used, in combination with the value of the phase difference (PD value) between the sinusoidal waves generated from the cos and sin wires, to determine a coordinate region defined by two adjacent selector element wires where the stylus pen is located and then the coordinate of the stylus-pen is calculated based on the PD value and the determined coordinate region.

BRIEF DESCRIPTION OF THE DRAWINGS

FIG. 2(a) shows an arrangement of conductors for X-coordinate detection of the system shown in FIG. 1, and FIGS. 2(b) and 2(c) are related graphs showing the relationships between the position of the stylus pen and the PD value and between the position of the stylus pen and the peak value of the output voltage produced in selector terminal pairs respectively in the conductor arrangement of FIG. 2(a).

FIG. 3(a) shows an arrangement of X-coordinate detection conductors in a coordinate detection system according to the present invention, FIG. 3(b) is a graph showing the relationship between the position of the stylus pen and the PD value in the conductor arrangement of FIG. 3(a), and FIGS. 3(c) and 3(d) are related graphs showing the relationship between the peak value of the output voltage produced in selector terminal pairs and the position of the stylus pen with the stylus pen substantially perpendicular to and tilted at an angle to the tablet, respectively.

DESCRIPTION OF THE PREFERRED EMBODIMENTS

Figure 3:
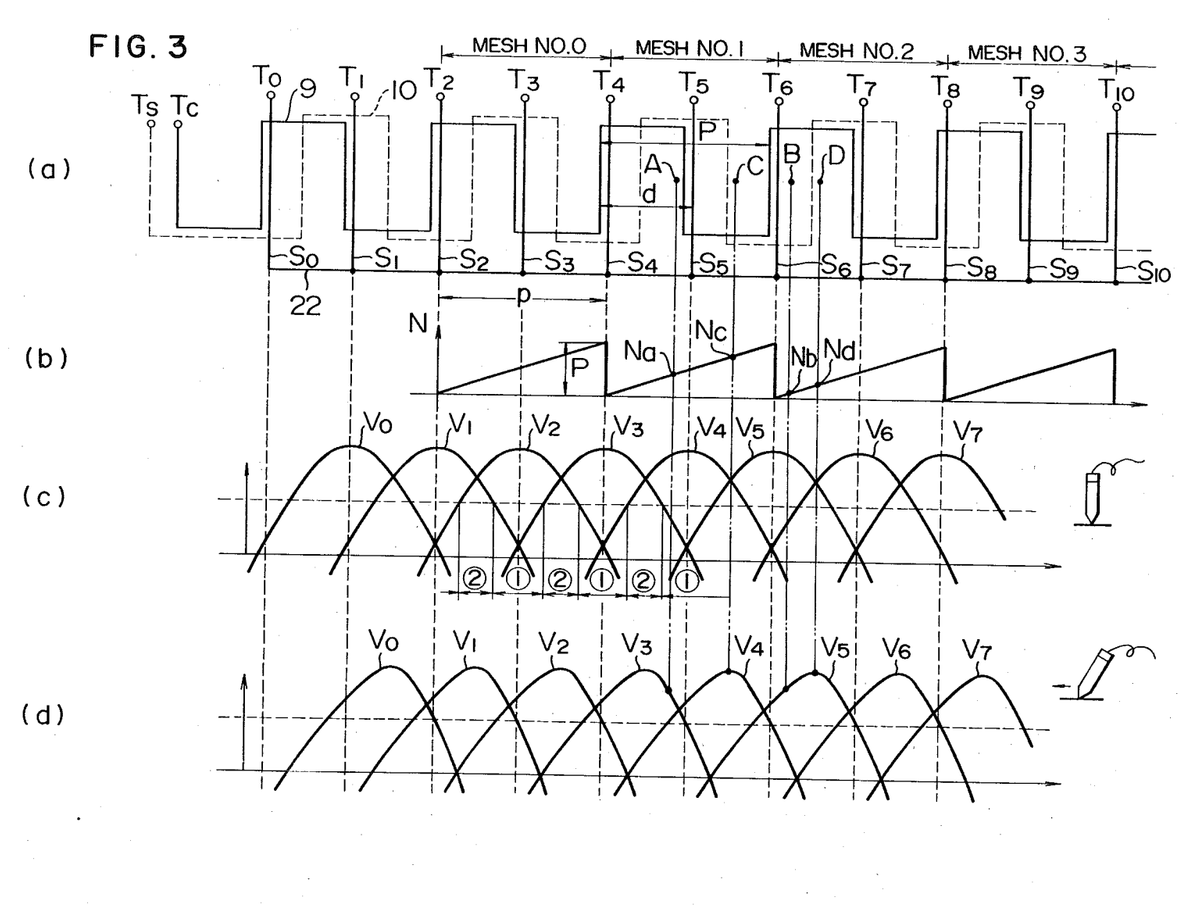

The present invention will be explained below with reference to an embodiment shown in FIGS. 3 and 4.

A layout of conductors for X-coordinate detection on the tablet of a coordinate detection system according to an embodiment of the present invention is shown in FIG. 3(a), which like FIG. 2(a) is compressed along the Y-axis and shows only a part thereof along the X-axis. A similar system is provided for Y-coordinate detection. This embodiment is identical to the conventional system shown in FIG. 2(a) except that in this embodiment, element wires $S_0, S_1, \ldots, S_n$ of the selector conductor are arranged at equal intervals each corresponding to a half cycle of the cos or sin wire and one pitch of the element wires corresponding to one cycle of the cos or sin wire, designated as meshes No. 0, No. 1, No. 2, No. 3 and so on, is defined by each of the element wire pairs $(S_2, S_4)$, $(S_4, S_6)$, $(S_6, S_8)$, $(S_8, S_{10})$ and so on respectively. Further, the effective region 7A of the tablet is located between the element wires $S_2$ and $S_{n-2}$ (not shown) while the parts defined by the element wire pairs $(S_0-S_2)$ and $(S_{n-2}-S_n)$ are disposed in the marginal region 7B.

Figure 4:
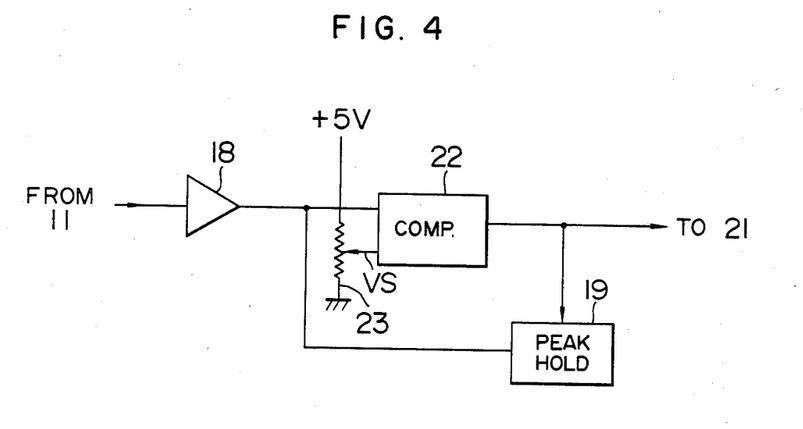
FIG. 4 is a block diagram showing a circuit configuration of parts of a coordinate detection system according to the present invention which are different from those of the conventional system of FIG. 1.

The circuit configuration of the coordinate detection system according to this embodiment is also the same as that of the conventional system of FIG. 1 except that in this embodiment, one of the two inputs of the comparator 22, which is connected to an earth potential in FIG. 1, is now connected to a predetermined voltage level Vs as shown in FIG. 4. The processing operation performed by the signal processor 21 for determining the X-coordinate or Y-coordinate of the stylus pen position is of course much more simplified than that of the conventional system, and therefore the processing program stored in the ROM (not shown), etc. provided to the signal processor 21 is naturally much simpler than that of the prior art. FIG. 4 shows only the parts related to the comparator 22. The comparator 22 produces a "1" signal when the input voltage applied thereto from an amplifier 18 is higher than a threshold level Vs supplied from a voltage level setter 23. The other points are the same as in the description made with reference to FIG. 1. FIG. 3(b) shows the PD value determined as an output of a counter 17 from the phase difference between output sinusoidal waves of the cos and sin wires. In the case where the stylus pen is located at points A, B, C and D, Na, Nb, Nc and Nd are stored as PD values respectively in the memory of the signal processor 21 as described above. Curves $V_1, V_2, V_3$ and so on in FIGS. 3(c) and 3(d) correspond to the curves $V_1, V_2, V_3$ and so on in FIG. 2(c). FIG. 3(c), however, represents a case in which the stylus pen is substantially perpendicular to the tablet so that the curves $V_1, V_2, V_3$ and so on are symmetric with respect to the selector element wires $S_1$, $S_2, S_3$ and so on, respectively, while FIG. 3(d) shows a case in which the stylus pen is tilted to the right at an angle to the tablet so that the curves $V_1, V_2, V_3$ and so on are asymmetric with respect to the selector element wires $S_1, S_2, S_3$ and so on with the "0" points shifted rightward. The threshold level Vs given by the voltage level setter 23 is selected to be equal to the peak value of an output voltage which is detected from a terminal pair corresponding to a given mesh No. 0 (the voltage measured at the output of the amplifier 18 in the circuit of FIG. 1), when the stylus pen is located at one of two element wires defining the given mesh, such as the selector element wire $T_4$ or $T_2$ at the extreme right or left respectively of mesh No. 0, and tilted to the right or left at the maximum possible angle under normal operating conditions. When the terminal pairs $(T_0, T_2)$, $(T_1, T_3)$ and so on are sequentially scanned and the threshold voltage level Vs is selected as set forth above, the number of output voltages each having a peak value exceeding Vs as detected by the comparator 22 is two or less as will be seen from FIGS. 3(c) and 3(d). The signal processor 21 stores therein the number of such terminal pairs where output voltages exceeding Vs are detected during one scanning cycle of the terminal pairs and the digital value of the peak value of each output voltage obtained as an output of an A/D converter, and further, in the case where at least one such output voltage is detected, the selector 11 is set to the first mode as mentioned above after completion of one scanning cycle for processing the outputs from the cos and sin wires to obtain the PD value, which is stored in the signal processor 21. On the basis of this data thus stored, the signal processor 21 determines a coordinate region, that is, a mesh in which the stylus pen is located and calculates the X-coordinate of the stylus pen position from the coordinate region and PD value thus determined.

Figure 5:
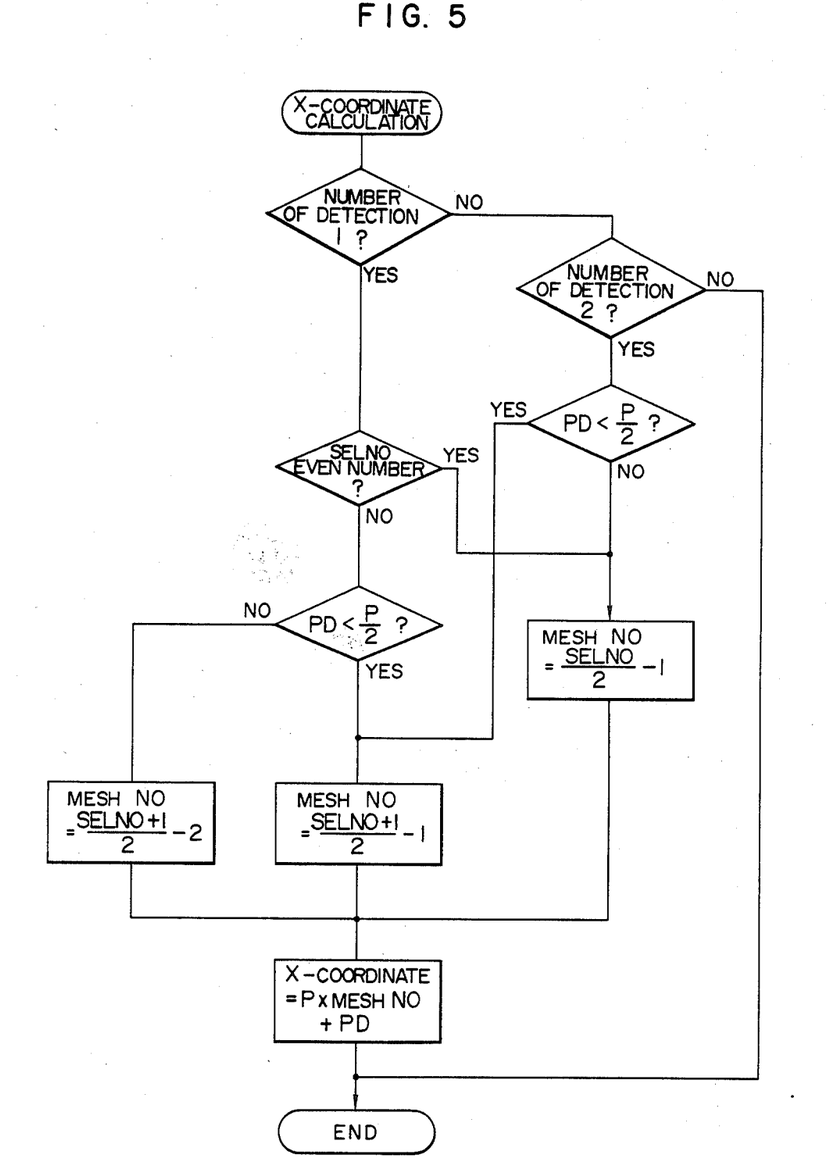
FIG. 5 is a flowchart of an operation to determine the X-coordinate of the stylus pen position.

This processing operation will now be explained with reference to the flow chart shown in FIG. 5. Assume that the terminal pairs $(T_0, T_2)$, $(T_1, T_3)$, ..., $(T_m, T_{m+2})$ which are sequentially scanned, are numbered by serial numbers 0, 1, ..., m, which are generally represented by SELNO. The number of detections of such terminal pairs where output voltages exceed Vs are detected, the value SELNO of the serial number of the terminal pair where the first detection occurs and the PD value are used to determine the mesh No. where the stylus pen is located according to the criteria shown in Table I.

TABLE I

| No. | Number of Detections | SELNO Odd or Even | PD value | Mesh No. |
|---|---|---|---|---|
| 1 | 1 | Even | — | SELNO/2 − 1 |
| 2 | 1 | Odd | $0 \leq PD < \frac{P}{2}$ | (SELNO+1)/2 − 1 |
| 3 | 1 | Odd | $\frac{P}{2} \leq PD < P$ | (SELNO+1)/2 − 2 |
| 4 | 2 | — | $0 \leq PD < \frac{P}{2}$ | (SELNO+1)/2 − 1 |
| 5 | 2 | — | $\frac{P}{2} \leq PD < P$ | SELNO/2 − 1 |

Note:
P is the PD value corresponding to one pitch. (See FIG. 3(b))

When the number of detections is 1, for instance, it is determined whether the SELNO of the terminal pair where detection is made is even- or odd-numbered. If it is odd-numbered, it is decided whether the PD value is larger than P/2 or not. Since the PD value is generally $0 \leq PD < D$, it is decided that the stylus pen is located in the coordinate region of $$\text{Mesh No.} = \frac{SELNO - 1}{2} - 1$$

if PD<P/2, and in the coordinate region of $$\frac{SELNO + 1}{2} - 2$$

if P/2≤PD. In the case where the stylus pen is located at point A in FIG. 3(a) substantially perpendicularly to the tablet, the number of detection is 1 and SELNO is 4 as seen from FIG. 3(c), so that it is determined that the stylus pen is positioned in mesh No. 1 from No. 1 in Table I. If the stylus pen is located at position A tilted at a certain angle to the tablet with the peak value of detection voltage as shown in FIG. 3(d), on the other hand, the number of detections is 2, SELNO=3 and 0<PD=Na<P/2, and therefore it is determined from No. 4 of the table that the stylus pen is located in mesh No. 1. Once the coordinate region of the stylus pen is determined, the X-coordinate may be obtained from a calculation according to an equation X-coordinate=P-×mesh No.+PD. This processing operation is executed by the signal processor in accordance with a program stored therein. FIG. 5 shows a flowchart for this processing operation. As explained above, this processing operation is executed after determining the PD value based on the output sinusoidal waves of the cos and sin wires upon detection of an output voltage having a peak larger than Vs during one scanning of the selector element wires. However, this processing operation is not executed in the absence of such a detection. The signal processor 21, has stored therein the number of detections, the SELNO of the terminal pair involving the first detection and the PD value at a predetermined address thereof. Also, in spite of the fact that the number of detections according to the present invention should be 1 or 2 since the value of threshold value Vs is determined as mentioned above, the processing operation is stopped by judging that detection is erroneous if 3 or more detections are made, that is, the number of detections is neither 1 nor 2.

The Y-coordinate of the stylus pen is of course determined in a manner similar to the method mentioned above.

The system described above is arranged to determine the X and Y coordinates of a given point. If determination of only one coordinate along X or Y axis is sufficient, however, the arrangement for determining the other coordinate may be omitted. Further, although the selector element wires are disposed to substantially meet with the rising and falling points of the cos wire, they may be arranged to meet with the rising or falling points of the sin wire, or they may be spaced by a predetermined distance from the rising or falling poins of the cos or sin wire. In the last-mentioned case, the spaced distance is of course compensated in the coordinate calculations.

According to the embodiment under consideration, selector element wires are arranged at each half cycle of cos and sin wires, and an output voltage having a peak value higher than a set voltage is detected from selected terminal pairs, so that calculations are made on the basis of the serial number of the selected terminal and PD value for the number of detections which is 1 or 2 respectively. Thus, the number of selector voltage detections is minimized to two at most, thereby greatly facilitating the process of determination of the X- or Y-coordinate as compared with the conventional device in which three detections may occur. Also, it is known that the tablet thickness can be increased by enlarging the pitch of cos and sin wires thereby to prevent the shadow of the conductors from being presented on the tablet surface in a coordinate detection system of the rear projection type. This arrangement cannot be applied, however, to the conventional configuration in which selector element wires are spaced from one another by a distance corresponding to one cycle of the cos and sin wires, because it involves a decrease in the selector detection voltage thereby making its detection difficult. According to the present embodiment with the selector element wires arranged at each half cycle, the selector detection voltage does not drop, thus, accurate detection is possible even when the cos and sin wires are increased in pitch.

Further, the mesh number instead of selector terminal number may be used for the decisions referred to above.

It will be understood from the foregoing description that according to the present invention, selector element wires are arranged at each half cycle of two conductors on a base plate, only an output selector voltage higher than a set value is detected from each terminal pair, and the coordinate region in which the stylus pen is positioned is determined from the number of detections, the position of the terminal pairs involving the detections and the PD value, so that detection of the coordinate region is greatly simplified and accurate detection facilitated while at the same time preventing the selector detection voltage from decreasing.

What is claimed is:

1. A coordinate detection system capable of detecting a coordinate of a given position in a predetermined region of a tablet, comprising:
   a pointer means including excitation means excited by a current of a predetermined frequency for pointing to a desired position on said tablet;
   a conductor arrangement on said tablet for cooperating with said excitation means of said pointer means to determine the coordinate of a position on the tablet pointed to by said pointer means in a predetermined direction, said conductor arrangement including a first conductor arrangement having two conductors arranged to cover said predetermined region on said tablet, said two conductors being formed in rectangular wave configurations of a predetermined cycle extending in said predetermined direction, the rectangular wave configuration of a first conductor of said two conductors being displaced by half a phase cycle from the rectangular wave configuration of a second conductor of said two conductors, and a second conductor arrangement having a base line extending in said predetermined direction and a plurality of equally-spaced element wires extending from said base line at intervals equivalent to half a phase cycle of the rectangular wave configuration of at least one of said first and second conductors of said two conductors in a direction perpendicular to said base line so as to cover said predetermined region;
   a detector including first detection means for detecting a phase difference between waveforms of voltages induced in said first and second conductors of said two conductors, while energizing said excitation means in said predetermined region of said tablet, and second detection means for scanning selected element wire pairs of said second conductor arrangement sequentially, and for detecting any element wire pair which produces an output voltage higher than a predetermined threshold level; and
   processing means for obtaining a first data capable of identifying a space between a selected element wire pair in which the position pointed to by said pointer means should exist based on the outputs of said first and second detection means, and for calculating the coordinate of said position based on said first data and a second data relating to said phase difference detected by said first detection means.

2. A coordinate detection system according to claim 1, wherein each of said element wires of said second conductor arrangement is arranged substantially in coincidence with selected ones of rising and falling portions of the rectangular wave configurations of one of said first and second conductors of said two conductors of said first conductor arrangement.

3. A coordinate detection system according to claim 1, wherein said predetermined direction is along the X axis of the X-Y coordinate, said system further comprising a third conductor arrangement similar to said first conductor arrangement and arranged substantially perpendicular thereto, and corresponding detector and processing means for determining the Y-coordinate of said position.

4. An apparatus for determining a coordinate of a given point in a predetermined region on a tablet, comprising:
   a pointer including excitation means to be energized by a high frequency current for indicating a desired point in said region on said tablet;
   a conductor arrangement arranged to cover said region on said tablet and including two conductors formed in rectangular wave configurations, respectively, and generally extending along one direction in said region, said rectangular wave configurations of said two conductors being spaced from each other by a half of one cycle of the rectangular wave, said conductor arrangement further including a plurality of element wires extending in a direction perpendicular to said one direction on said tablet and equally spaced from one another by a distance corresponding to a half of one cycle of the rectangular wave;
   a detector including first detection means for detecting a phase difference between voltage signals induced in said two conductors when said pointer is disposed to indicate a given point in said region and said exciting means is energized by said high frequency current, and second detection means for scanning selected pairs of said element wires, sequentially, so as to detect output voltage signals produced across each pair of said element wires which is higher than a predetermined level; and
   processing means for determining, based on said phase difference detected by said first detection means and said output voltage signals detected by said second detection means, the space between the selected pairs of element wires in which said given point indicated by said pointer exists and the coordinate of said given point in said one direction in said region.

5. An apparatus according to claim 4, wherein said element wires are arranged substantially in coincidence with the rising and falling portions of the rectangular wave of one of said two conductors, respectively.

6. An apparatus according to claim 4, wherein said predetermined direction is along the X axis of the X-Y coordinate, said apparatus further comprising an additional conductor arrangement, detector and processing means for determining the Y-coordinate of said point.

* * * * *